March 15, 1955 D. J. MORAGA 2,704,046
IRRIGATION SIGNAL
Filed Aug. 30, 1952
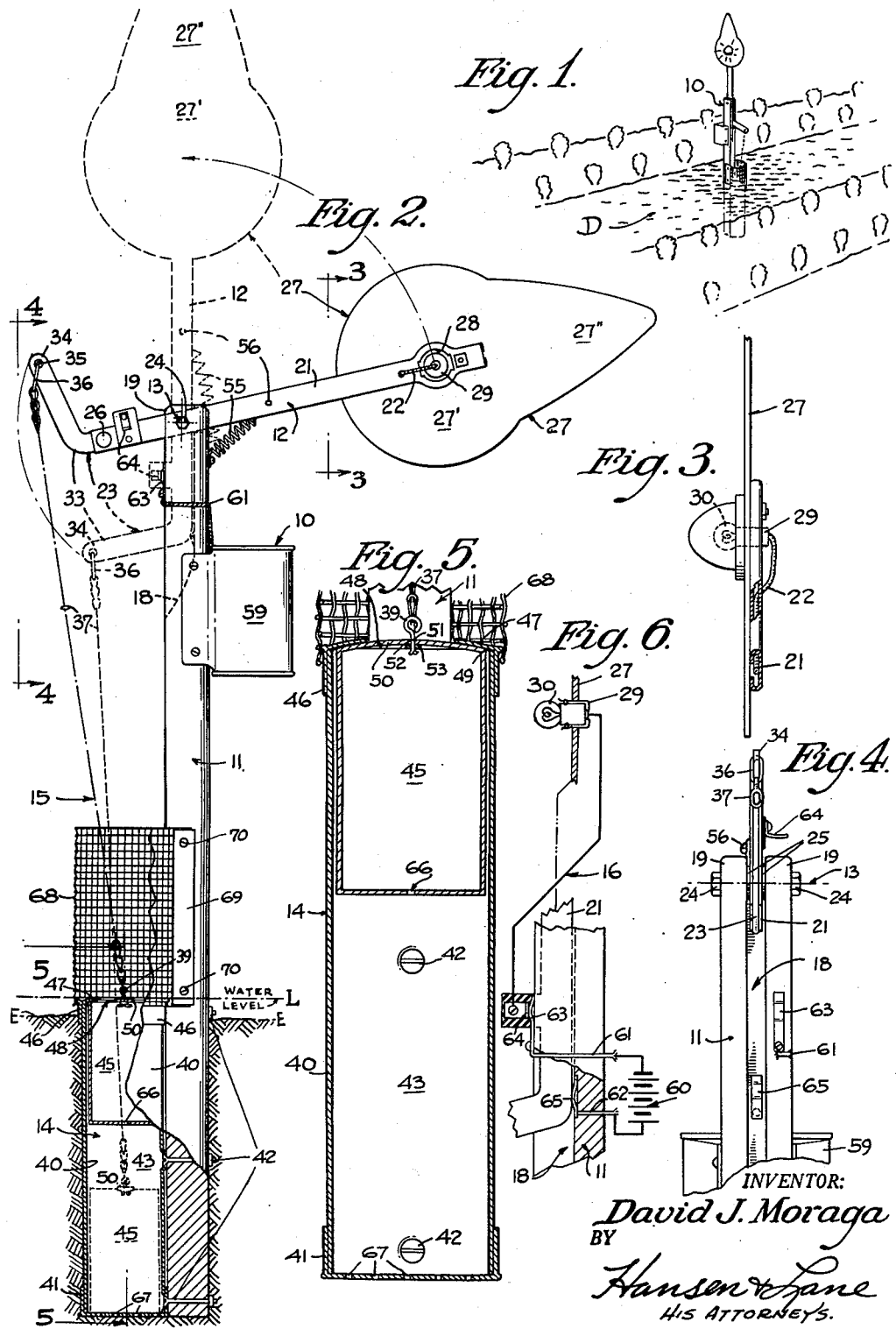
INVENTOR:
David J. Moraga
BY
Hansen & Lane
HIS ATTORNEYS.

United States Patent Office 2,704,046
Patented Mar. 15, 1955

2,704,046

IRRIGATION SIGNAL

David J. Moraga, King City, Calif.

Application August 30, 1952, Serial No. 307,212

3 Claims. (Cl. 116—118)

This invention relates broadly to irrigation signals and more particularly to certain novel improvements therein for detecting the arrival of water at a predetermined level and means associated therewith for operating the signal.

Numerous patents have been issued showing signals employing the float principle for effecting operation of an alarm. These devices while effective for the purpose, have several disadvantages such as clogging of the float by floating particles of straw, sticks, and the like which render the float inoperative resulting in signal failure.

The present invention contemplates an arrangement for overcoming the foregoing objectionable characteristics in an automatic signalling device by the provision of a signal operating medium employing the weight of water to effect operation of the signal.

Another object is to provide a pit or chamber embedded in earth to afford movement of the weight type operating medium for the signal.

It is a further object of this invention to provide a screen or guard in combination with the pit or chamber for assuring operation of the weight type operating medium irrespective of the presence of straw, sticks, or wood on the surface of the water around the signal.

These and other objects or advantages of this invention will become apparent from a reading of the following description in the light of the drawings, in which:

Fig. 1 is a perspective view of a field under irrigation and illustrating the disposition of a signal therein embodying the present invention.

Fig. 2 is an enlarged side elevational view of the signal shown in Fig. 1 with parts thereof broken away for purposes of illustration.

Fig. 3 is a section taken along line 3—3 in Fig. 2 looking toward the head of the signal arm thereof and at slightly larger scale.

Fig. 4 is a fragmentary elevational view taken from line 4—4 in Fig. 2 and at slightly larger scale with respect thereto.

Fig. 5 is an enlarged sectional view through the base pit of the signal shown in Fig. 2 and taken along line 5—5 thereof.

Fig. 6 is a skeletonized detail of portions of the signal shown in Figs. 1 through 4 associated with a wiring diagram therefor.

The signal, generally designated by numeral 10 in Figs. 1 and 2, comprises a standard 11 having a signal arm 12 pivotally mounted as at 13 to its upper end and a water level detector 14 at its lower end operatively connected by a linkage 15 to the signal arm 12 for operating the latter responsive to the effect of water on the water level detector.

The foregoing combination is generally known as is the electrical circuit 16 and appurtenances thereof. However, for purposes of clarity these general features will now be described in detail to afford a better understanding of this invention.

The standard 11 may be any well known form of a stake, such as a wooden post, channel iron or the like, adapted to be driven into the earth so as to stand erect to support the signal arm 12 at its upper end. In the present disclosure the standard is of wood approximately 1½ x 1½ inches square in cross section to provide front and rear as well as side walls on the standard. The standard has a saw kerf 18 cut lengthwise thereof into its rear wall adjacent its upper end. The saw kerf 18 forms a groove in the rear wall and extending downwardly from the upper end of the standard. This kerf 18 is cut substantially midway the side walls of the standard and extends from front to rear wall across the upper end thereof to provide opposing ears 19 for receiving the signal arm in the manner illustrated in the drawings.

The signal arm 12 is preferably a channel 21 having inturned outer flanges, Fig. 3, spaced from an integral web to provide a conduit for a strand of wire 22. This channel shape of the arm 12 also affords the reception of a solid extension 23, one end of which fits into the channel between its inturned flanges and the back web to a point slightly past the pivotal connection 13 between the arm 12 and the standard 11. The channel as well as the leg of the extension 23 embraced thereby are both drilled to receive the shank of a bolt 24 also carrying washers 25 which flank the channel arm 12 where it fits between the ears 19 on the upper end of the standard. The extension 23 is further secured to the arm 12 by a rivet 26 as best seen in Fig. 2.

The opposite or free end of the channel arm 12 is secured to a metal plate 27 constituting a flag having a circular main portion 27' from which a spear-shaped pointer 27'' extends.

The web of the channel arm 12 is open as at 28 concentric to the circular portion 27' of the flag to accommodate a socket 29 which is secured to the metal plate 27. The plate 27 carries a colored glass cover over a lamp 30 having a bayonet type base secured into the socket 29. The extreme end of the arm 12 is also secured to the plate 27 in radial alignment with the axis of the pointer 27'' by a nut and bolt. Obviously this could be a welded connection if desired. The aforementioned wire 22 which runs up through the channel arm 12 has its free end soldered to the center contact of the socket 29. The shell of the socket 29 is insulated relative to center contact but electrically connected to the metal plate 27.

That portion 33 of the extension 23 which extends beyond the channel arm 12 is preferably bent laterally, that is backwardly relative to the rear wall of the standard 11 and in a plane congruent to the path of swinging movement of the arm 12. The extreme end 34 of the extension 23 has a hole 35 formed therethrough for receiving a split ring 36 also strung through the last link of a chain or a looped end of a flexible cable 37. The opposite end of this chain or flexible linkage 37 is secured to an eye hook 39 on the aforementioned water level detector 14.

The water level detector 14 comprises an elongated cylinder 40 having its bottom closed by a cap 41 and its top open. This cylinder 40 is secured by bolts 42 to the rear wall of the standard so as to provide a pit or chamber 43 adjacent the lower extremity thereof.

A weighing means in the form of a receptacle 45 is disposed in the chamber or pit 43. This receptacle is arranged for up and down movement in the pit which is better than twice the depth of the receptacle to serve as a guide to restrict the up and down movement of the receptacle to a path substantially parallel to the standard 11.

The open upper end of the cylinder 40 is capped with a member 46 much the same as the bottom cap 41 except that the upper cap member 46 has an inturned flange 47 surrounding a central opening 48. The annular flange 47 serves as a stop against which the upper rim 49 of the receptacle 45 abuts to limit its movement in an upward direction. A strap or bar 50 extends diametrically across the open upper end of the receptacle 45 and this bar 50 has its ends secured to the upper rim 49 as best seen in Fig. 5.

The strap or bar 50 is provided with a hole 51 on the vertical axis of the receptacle to receive the stem 52 of the eye hook 39. The stem 52 of the hook 39 is flared after a washer 53 is placed thereon against the under side of the bar 50. Thus the eye hook is free to turn about the axis of its stem 52 to prevent twisting of the flexible linkage 37 irrespective of turning of the receptacle 45 relative to the cylinder 40, i. e., within the pit or chamber 43.

As best illustrated in Figs. 1 and 2, the standard 11 is embedded in the earth E to a depth calculated to dispose the open upper end of the cylinder 40 slightly above the surface of the earth. In other words, the open top of the upper cap member 46 is set at a horizontal plane which becomes the level L to which irrigation water will rise above and relative to the surface of the earth. As shown in Fig. 1 the signal unit 10 is placed in an irrigation ditch or trench D between beds of row crops usually at or near that end of the ditch which is most remote from the source of supply of the irrigation water.

Thie signal 10 is placed in the dry ditch in the manner hereinbefore explained with the signal side of the arm 12, i. e., the channel, flag and lamp, etc., in their lowermost position (solid lines Fig. 2). With the signal side of the arm thus disposed the detector side of the arm, including extension 23 and related movable elements linked thereto, is at its highest limit of movement to pull upwardly on the flexible linkage and thereby maintain the receptacle 45 in abutment with the annular flange 47 formed on the upper cap member 46 of the cylinder 40. It should here be noted that the weight of the signal arm 12, flag, lamp and socket on the signal side of the pivot 13 is calculated to counterbalance with the weight of the extension 23, chain and receptacle on the detector side of the pivot bolt 13 when the receptacle 45 is empty. However, a tension spring 55 having one end anchored to the standard 11 and its other end secured as at 56 to the signal side of the arm 12 (channel 21) tends to maintain the flag 27 in its lowered position when the receptacle 45 is empty. The tensil capacity of the spring 55 and position 56 at which it is secured to the channel 21 is calculated to yield to the weight of the quantity of water which the receptacle 45 will hold. Consequently, when the irrigation water reaches the lever L, i. e., the open top of the cylinder 40, the water flows into the receptacle 45 filling it up with a sufficient quantity of water to weigh the receptacle 45 down against the action of the spring 55. In this manner the flexible linkage 37 connected to the receptacle 45 and the extension 23 on the detector side of the arm 12 swings the latter counterclockwise full to dotted lines (Fig. 2) into a position in which the flag 27 is raised, full lines Fig. 1.

In conjunction with the raising of the flag 27 as aforesaid, the lamp 30 is illuminated in a manner now to be explained. It will be noted that a battery box 59 is secured to the front wall of the standard 11 a sufficient distance above the open upper end of the cylinder 40 (water level L) to keep water from entering the box 59. A dry cell form of battery 60 is sealed in the box 59 and has two lead wires 61 and 62, connected to the battery terminals, extending exteriorly of the box. The wire 61 extends across one side wall of the standard and is soldered to a contact point 63 secured to the rear wall of the standard. A companion contact point 64 carried by the detector side of the arm 12 makes electrical contact with the contact point 63 when the flag 27 is raised. This companion contact point 64 is insulated from the arm 12 but connected by solder or the like to the electrical wire 22 which runs up within the signal side of the arm to the center contact of the socket 29. The shell of the socket which is insulated from the center contact is connected to the metal plate which constitutes the flag 27 which in turn is connected to the metal channel 21. Thus the metal signal arm 12 is in circuit with the lead wire 61 from the battery 60 when the contact points 63 and 64 are touching each other. To complete the electrical circuit 16 through the opposite lead wire 62 to the battery, the signal arm 12 makes contact with a leaf spring contact 65, Figs. 4 and 6, disposed in the base of the saw kerf 18 and connected to the free end of the lead wire 62.

From the foregoing it will be apparent that when the signal arm is raised to the position shown in Fig. 1 the detector side of the arm 12 is disposed within the groove or kerf 18 to thereby complete the electrical circuit 16 from the battery 60 to the lamp 30. Thus the lamp 30 becomes illuminated to give a signal in the dark as well as the light.

When the flag is raised and the lamp illuminated in the foregoing manner, it indicates to the person controlling the flow of irrigation water, at a place remote from the signal 10, that the desired or maximum input of water, for the time being, has been reached. Thus the valve controlling the influx of water into the irrigation ditches can be turned down or off until the water soaks into the earth and before it runs over the sides of the ditches into the beds of row crops or an adjoining field, for instance another person's property.

It should here be noted that the receptacle 45 has an opening or openings 66 in its bottom wall to allow the water in the receptacle to drain out at a rate substantially comparable to the rate at which the water level drops by percolation into the earth. The bottom cap 41 of the cylinder 40 is also perforated as at 67 for the same reason as just stated so that as the water level recedes in the receptacle it is constantly draining out of the chamber or pit 43 to lighten the weight of the receptacle 45 whereby the spring 55 can again urge the signal arm into its normal or lowermost position.

In connection with the foregoing it will be noted that the open upper end of the pit or chamber 40 is guarded by a wire mesh cage 68 for preventing floating straw, sticks and the like from entering the chamber and clogging the same. This cage 68 comprises a section of ¼ inch mesh wire bowed around the upper cap member 46 and extending upwardly therefrom. The ends of the bowed wire are secured against the respective side walls of the standard 11 by plates 69 and several screws 70, as best seen in Fig. 2. With this guard or cage 68 the open upper end of the chamber 40 is kept clear of all debris so that the flexible linkage 37 as well as the receptacle 43 is free to operate in the manner intended. Consequently, as the water in the irrigation ditch D seeps into the earth and the water drains from the receptacle 45 as well as the pit or chamber 40, the spring 55 tends to draw the signal arm 12 from erect position toward lowered position. In this manner, the lamp 30 is first extinguished by opening of the electrical circuit 16 when the contact points 63—64 separate. This puts the man at the valve, where the irrigation water flows in, on notice that the water level has receded. He can therefore start the flow of water toward the signal 10 promptly even though the flag 37 is not completely down.

From the foregoing it will be apparent that I have provided an improved irrigation signal which is economical in manufacture and which has the advantage of a water lever detector operating directly responsive to level of the irrigation water adjacent the surface of the earth. Moreover, this operation is assured irrespective of the presence of floating materials around the detector to apprise the person at the control valve promptly that the water level has been attained or has dropped adjacent the signal.

While I have described the foregoing structure in specific detail it will be apparent to those skilled in the art that such structure can be modified, altered or varied without departing from the spirit of this invention. I, therefore, desire to avail myself of all modifications, alterations and/or variations coming fairly within the purview of the following claims.

What I claim as new and desire to protect by Letters Patent is:

1. In an irrigation signal of the type including a standard having a signal arm pivotally mounted adjacent its upper end normally weighed down on its signal side and up at its detector side relative to its pivotal mounting and adapted to be swung to raise its signal side by a pull exerted on its detector side through a linkage having one end secured to the latter; a water level detector comprising an elongated guide cylinder secured to the base end of said standard in parallel relation thereto on the detector side thereof, a receptacle arranged in said cylinder for guided sliding movement thereby coaxially of said guide cylinder, said guide cylinder having an inturned flange at its upper end for retaining said receptacle therein, means at the upper end of said receptacle connected to the opposite end of said linkage for maintaining said receptacle in engagement with said inturned flange under the normal weighing influence of the signal side of said signal arm, said cylinder being adapted to be embedded in earth with the base of said standard to dispose the open upper end of said cylinder at a level to which it is desired to have irrigation water rise for admitting such water directly into said receptacle for exerting a prompt downward pull upon said linkage.

2. In an irrigation signal of the type including a standard having a signal arm pivotally mounted adjacent its upper end normally weighed down on its signal side and up at its detector side relative to its pivotal mounting and adapted to be swung to raise its signal side by a pull exerted on its detector side through a linkage having one end secured to the latter; a water level detector comprising an elongated guide cylinder secured to the base end of said standard in parallel relation thereto on the detector side thereof, a receptacle arranged in said cylinder for guided sliding movement thereby coaxially of said guide cylinder, said guide cylinder having an inturned flange at its upper end for retaining said receptacle therein, means at the upper end of said receptacle connected to the opposite end of said linkage for maintaining said receptacle in engagement with said inturned flange under the normal weighing influence of the signal side of said signal arm, said cylinder being adapted to be embedded in earth with the base of said standard to dispose the open upper end of said cylinder at a level to which it is desired to have irrigation water rise for admitting such water directly into said receptacle for exerting a prompt downward pull upon said linkage, said receptacle having a perforated bottom calculated to afford drainage of such water therefrom at a rate comparable to the rate at which irrigation water percolates into the earth.

3. In an irrigation signal of the type including a standard having a signal arm pivotally mounted adjacent its upper end normally weighed down on its signal side and up at its detector side relative to its pivotal mounting and adapted to be swung to raise its signal side by a pull exerted on its detector side through a linkage having one end secured to the latter; a water level detector comprising an elongated guide cylinder having an inturned flange at its open upper end, a receptacle arranged in said cylinder for guided sliding movement thereby coaxially thereof, a cross bar at the upper end of said cylinder connected to the free end of said linkage, and means for securing said cylinder to the detector side of said standard adjacent the base end thereof for embedment into earth therewith to dispose the open upper end of said cylinder at a plane to which it is desired to have the irrigation water rise and in which the upper end of said receptacle engages the inturned flange on said cylinder under the influence of the weight of the signal side of said signal arm upon said linkage whereby water overflowing into the open upper end of said cylinder pours directly into said receptacle to weigh the same down to exert a downward pull upon said linkage, and a wire mesh guard around the open upper end of said cylinder for obstructing admittance of flotsam into said receptacle.

References Cited in the file of this patent

UNITED STATES PATENTS

| | | |
|---|---|---|
| 1,123,819 | Twibell | Jan. 5, 1915 |
| 1,248,633 | Doak | Dec. 4, 1917 |
| 1,429,684 | Muldner | Sept. 19, 1922 |
| 2,594,885 | Due | Apr. 29, 1952 |
| 2,607,835 | Bonar | Aug. 19, 1952 |

FOREIGN PATENTS

| | | |
|---|---|---|
| 590,336 | France | Mar. 14, 1925 |